United States Patent [19]

Liermann et al.

[11] Patent Number: 5,249,754
[45] Date of Patent: Oct. 5, 1993

[54] METHOD OF AND ARRANGEMENT FOR GRIPPING STARTING PORTION OF COILED FILM

[75] Inventors: Traugott Liermann, Unterhaching; Franz Nadler, Dietersheim; Jürgen Risser, Neufahrn, all of Fed. Rep. of Germany

[73] Assignee: Agfa-Gevaert AG, Leverkusen, Fed. Rep. of Germany

[21] Appl. No.: 874,607

[22] Filed: Apr. 27, 1992

[30] Foreign Application Priority Data

May 28, 1991 [DE] Fed. Rep. of Germany ....... 4117386

[51] Int. Cl.$^5$ .............................................. B21C 47/18
[52] U.S. Cl. ........................................ 242/55; 242/57; 242/195; 226/92
[58] Field of Search ............... 242/55, 78.8, 58.4, 242/57, 195; 226/92

[56] References Cited

U.S. PATENT DOCUMENTS

| | | | |
|---|---|---|---|
| 3,010,672 | 11/1961 | Cecil, Jr. ......................... | 242/78.8 |
| 3,733,036 | 5/1973 | Eitzenberger ..................... | 242/192 |
| 3,746,229 | 7/1973 | Feller et al. ..................... | 242/78.8 |
| 4,399,729 | 8/1983 | Malinowski et al. ................ | 242/78.8 |
| 4,608,844 | 9/1986 | Lehmann et al. ................... | 242/78.8 |
| 4,674,697 | 6/1987 | Filter et al. ..................... | 242/78.8 |
| 4,721,263 | 1/1988 | Miyazaki ......................... | 242/55 |
| 4,840,320 | 6/1989 | Shigeta et al. .................... | 242/58 |
| 5,096,134 | 3/1992 | Sakano ........................... | 242/57 |
| 5,121,886 | 6/1992 | Perego ........................... | 242/57 |

Primary Examiner—William A. Cuchlinski, Jr.
Assistant Examiner—C. W. Fulton
Attorney, Agent, or Firm—Michael J. Striker

[57] ABSTRACT

For lifting and grasping a starting portion of a film located in a coil, the method includes driving a coil by a friction wheel abutting against an outer surface of the coil with an end edge of a starting portion of the coil located arbitrarily on the outer surface, placing a separating wedge under a prestress on the outer surface of the coil and lifting the starting portion of the film from the coil by an edge of the separating wedge, and first turning the coil against a latter uncoiling direction, and after a recognition of a position of the end edge of the starting portion of the film turning the coil in the uncoiling direction.

12 Claims, 2 Drawing Sheets

METHOD OF AND ARRANGEMENT FOR GRIPPING STARTING PORTION OF COILED FILM

BACKGROUND OF THE INVENTION

The present invention relates to a method of and an arrangement for lifting and gripping a starting portion of a film, located in a coil More particularly, it relates to such a method and an arrangement in accordance with which a separating wedge abuts with prestressing on an outer surface of the coil and its edge lifts the starting portion of the film from the coil, and a transporting moves the lifted starting portion of the film to a subsequent mechanical system.

Methods and arrangements of the above mentioned general type are known in the art. One of such methods and arrangements is disclosed for example in the U.S. Pat. No. 3,733,036. In the arrangement described in this reference a separating wedge abuts with pretensioning on the coil of a roll film, and the coil is rotated in an uncoiling direction. The separating wedge wraps over the outer surface of the film coil, engages under the end edge at the starting portion of the film and releases the starting portion of the film from the coil. This solution, however, has the disadvantage that due to the friction forces between the outer surface of the film and the separating wedge, the uppermost coil layer is displaced and the film is loosened. Therefore a loop is produced. This can lead to the situation when the separating wedge does not engage the end edge and an automatic threading in is no longer possible.

SUMMARY OF THE INVENTION

Accordingly, it is an object of the present invention to provide a method of and an arrangement for gripping a starting portion of the film, which avoids the disadvantages of the prior art.

More particularly, it is the object of the invention to provide a method of and an arrangement for gripping a starting portion of a film, in which the danger of loop formation is avoided.

In keeping with these objects and with others which will become apparent hereinafter, one feature of the present invention resides, briefly stated, in a method in accordance with which a coil is first turned against a later uncoiling direction, and after recognition of the position of an end edge of the staring position of the film is turned in the uncoiling direction.

The invention makes use of the understanding that the danger of loosening the film by the separating wedge rubbing on the coil is lower when the separating wedge rubs less over the coil, before it strikes against the end edge of the film.

In accordance with the present invention, the coil first is turned against the later uncoiling direction. The separating wedge which rubs over the film acts as a certain tensioner of the coil. When the separating wedge rubs over the end edge, it reaches a stage whose height corresponds to the film thickness. The stage is recognized by a sensor and then the coil is stopped. The separating wedge is located now at a small distance from the end edge of the film. Now the coil is turned in the uncoiling direction, and the separating wedge must rub only over a short stroke over the film before it reaches the end edge of the film end.

It has been shown that it is advantageous for a reliable operation when the film coil first is tensioned before the lifting and gripping of the free end described above starts. For this purpose a friction wheel engages the outer surface of the coil and a motor drives a shaft on which the coil is arranged. The friction wheel and the motor rotate the coil in an opposite direction that actuates a tensioning of the film on the coil. The step to be detected has a height corresponding to the thickness of a film. The thickness of the film is usually in the range of hundredth millimeter and therefore it is difficult to detect this step. It has been shown that this small step can be recognized by a piezoelectric measuring element mounted on the separating wedge and provided with a measuring tip which also rubs over the coil.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
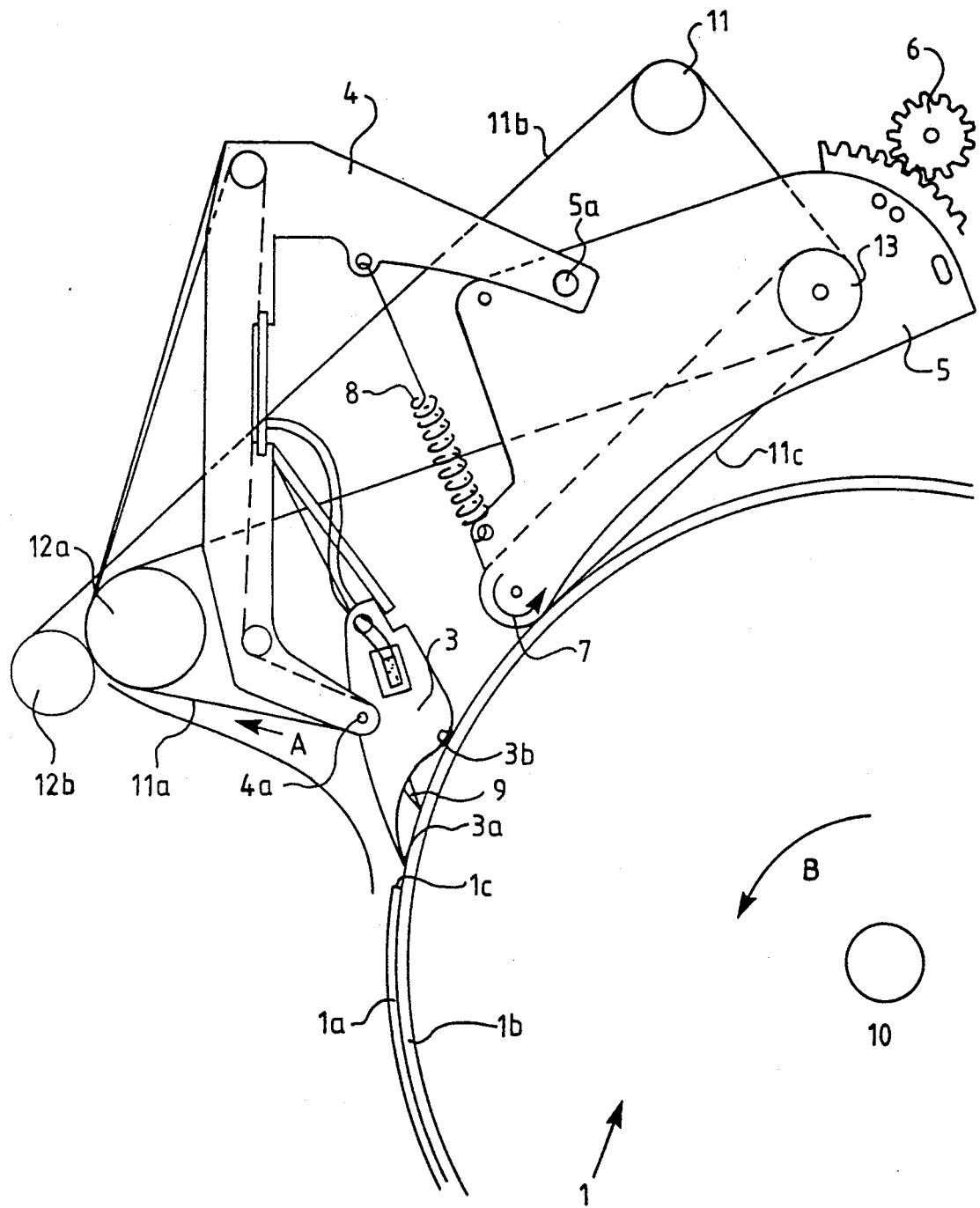
FIG. 1 is a view partially schematically showing a mechanical system of an arrangement for gripping a starting portion of a film in accordance with the present invention.

Individual elements of the mechanical system of an arrangement for automatic lifting and gripping a starting portion of a film in accordance with the present invention are shown in FIG. 1. For better illustration a film coil 1 is overdimensioned. Only upper layers 1a and 1b of the film coil 1 are shown accurately. The film has an end edge 1c which is located in any position on an outer surface of the film coil. A separating wedge 3 abuts with its edge 3a on the film coil and has a sliding part 3b.

The separating wedge 3 is mounted on a lever 4 turnably about a bearing 4a. The lever 4 is supported on a turning arm 5 rotatable about a bearing 5a. A transmission 6 moves the whole turning arm 5 together with the lever 4 mounted on it and with the separating wedge 3 from a not shown rest position in which the separating wedge 3 does not contact the coil 1, to a working position in which the separating wedge 3 and a friction wheel 7 abut against the film coil. Film coils with different diameters are treated in the same way. In the event of smaller diameters, the turning arm moves correspondingly further. A spring 8 pretensions the lever 4 relative to the turning arm 5. This provides a definite pressure of the separating wedge 3 on the film coil 1. The separating wedge 3 due to its rotary bearing 4a always abuts uniformly against the film coil, even when the lever 4 is under another angle.

A sensor 9 is mounted on the separating wedge 3. The sensor 9 senses the outer surface of the film coil 1 near the end edge 1c. The separating wedge 3 and the sensor 9 are shown in detail in FIG. 2.

In order to transport the film after it is lifted from a coil, several belts and rollers are provided. First, the starting portion of a film with its end edge 1c reaches an endless transporting belt 11a which moves in direction of the arrow A and takes along the starting portion of the film in the direction of both transporting rollers 12a and 12b. Both transporting rollers 12a and 12b and the transporting belt 11a are moved over a drive belt 11b. The transporting belt 11a presses over a deviating roller 13 and the transporting rollers 12a and 12b and further goes to a belt motor 11. A further belt 11c runs on the deviating roller 13 and drives a friction wheel 7. The transporting belt 11a is driven by the transporting roller 12a. All elements required for transportation of the film including the friction wheel 7, the transporting belt 11a, and the transporting rollers 12a and 12b are mechanically coupled and centrally driven by the belt motor 11.

It has been recognized that the coil under the action of outer factors, such as for example shaking during transportation or the stiffness of the film itself, has a tendency to loosen. It is therefore advantageous when before the lifting and gripping of the starting portion of the film, the coil is tensioned. In accordance with the present invention it is performed in that a motor 10 turns the shaft which supports the coil in the direction of the arrow B, while simultaneously the friction wheel 7 abutting against the outer surface of the coil 1 is stopped and thereby the outer layers 11a and 11b of the coil are fixed. The motor can turn the coil 1 only so much until the loop between the individual layers of the film is eliminated and the film forms a tight coil 1. It is also possible to drive the film coil 1, 1' additionally with the friction wheel 7 so that a differential speed occurs between the core and the outer surface of the coil 1, 1', whereby the film on the coil 1, 1' is tensioned.

Figure 2:
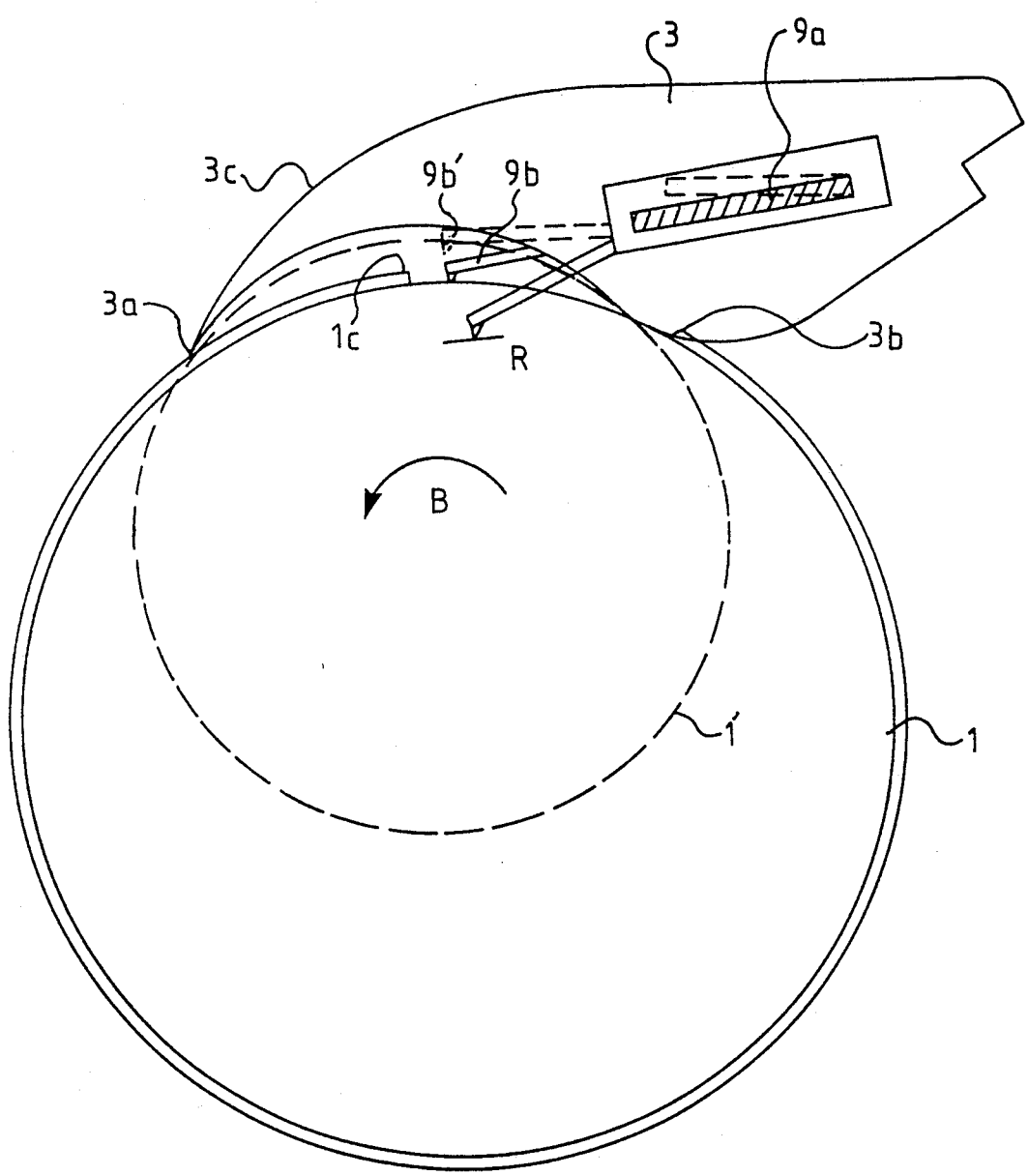
FIG. 2 is a view showing a separating wedge with a sensor of the inventive arrangement.

FIG. 2 shows details of the separating wedge 3 and the piezoelectric measuring element 9 which is mounted on it. The remaining above described elements, such as the lever 4, and the turning arm 5 are dispensed with for the sake of better illustration. For demonstrating the use of the separating wedge 3 for coils of different diameters, a coil 1' with substantially smaller diameter is illustrated with a broken line near the coil 1. In both cases the separating wedge 3 abuts with its edge 3a and the sliding part 3b against the coil 1 or 1'.

The sensor 9 includes substantially a small piezoplate 9a and a sensing tip 9b. The sensor 9 is spring biased on the separating coil 3, and in the rest position the tip 9b is located in the position R. When the separating wedge 3 is placed on the coil 1, a bending moment in the piezoplate 9a is produced. The smaller the used coil is, the further is bent the sensing tip 9b in the separating wedge 3. In the drawings this is shown for the coil 1' and the testing tip 9b, both shown in broken lines.

In accordance with the present invention, the coil 1 or 1' is first moved in a rotary direction B. The sensing tip 9b which due to its elastic support always abuts against the outer surface of the coil 1, 1' follows the step on the end edge 1c of the film. This movement of the sensing tip 9b produces a tension in the piezoplate 9b. The tension is evaluated in a not shown electronic system connected with the plate and thereby recognizes the starting portion of the film. After this, the coil 1 or 1' is braked. The braking path of the coil 1 or 1' is dimensioned so that the end edge 1c comes to stand behind the edge 3a of the separating wedge 3 as considered in the rotary direction B. Then the rotary direction of the coil 1 or 1' is reversed and the edge 3a of the separating wedge 3 engages under the end edge 1c of the film and lifts the starting portion of the film from the coil 1 or 1'. The film slides over the curved outer surface 3c of the separating wedge 3 in direction of the transporting rollers 12a, 12b and the transporting belt 11a which are shown in FIG. 1.

It will be understood that each of the elements described above, or two or more together, may also find a useful application in other types of methods and constructions differing from the types described above.

While the invention has been illustrated and described as embodied in a method of and arrangement for lifting and grasping a starting portion of a film in a coil, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of lifting and grasping a starting portion of a film located in a coil, comprising the steps of driving a coil by a friction wheel abutting against an outer surface of the coil with an end edge of a starting portion of the coil located loosely and directly on the outer surface; placing a separating wedge under a prestress on the outer surface of the coil, and lifting the starting portion of the film from the outer surface of the coil by an edge of the separating wedge; and before the lifting, first turning the coil against a latter uncoiling direction and after a recognition of a position of the end edge of the starting portion of the film turning the coil in the uncoiling direction, said recognition of the position of the end edge of the film being performed by a mechanical sensor having a sensing tip.

2. A method as defined in claim 1; and further comprising supplying the lifted starting portion of the film by a transporting device to a subsequent mechanical system.

3. A method as defined in claim 1, wherein said turning includes driving the film coil against the uncoiling direction by a motor which drives a shaft supporting the coil, and driving the coil by the friction wheel abutting against the outer surface of the coil so that between a core of the coil and the outer surface of the coil a differential speed is produced and therefore the film on the coil is tensioned.

4. A method as defined in claim 1, wherein said sensor which is mounted on the separating wedge.

5. A method of lifting and grasping a starting portion of a film located in a coil, comprising the steps of driving a coil by a friction wheel abutting against an outer surface of the coil with an end edge of a starting portion of the coil located arbitrarily on the outer surface; placing a separating wedge under a prestress on the outer surface of the coil, and lifting the starting portion of the film from the coil by an edge of the separating wedge; and before the lifting, first turning the coil against a latter uncoiling direction and after a recognition of a position of the end edge of the starting portion of the film turning the coil in the uncoiling direction, the recognition of the position of the end edge of the film being performed by a sensor which is mounted on the separating wedge and has a piezoelectric measuring element.

6. A method as defined in claim 5, wherein said recognition includes recognition by a sensor which has a piezoelectric measuring element loaded with bending.

7. An arrangement for lifting and grasping a starting portion of a film located in a coil, comprising a friction wheel which abuts against an outer surface of a coil of a film in which an end edge of a starting portion of the film is located loosely and directly on the outer surface of the coil; a separating edge abutting with prestress on an outer surface of the coil and having an edge which lifts a starting portion of the film from the outer surface of the coil; means for recognizing a position of the end edge of the starting portion of the film and including a mechanical sensor having a sensing tip; and means for first turning the coil opposite to a later uncoiling direction and then after the recognition of the position of the end edge of the starting portion of the film turning the coil in the uncoiling direction.

8. An arrangement as defined in claim 7; and further comprising means for transporting the lifted starting portion of the film to a subsequent mechanical system.

9. An arrangement as defined in claim 7, wherein said turning means includes a shaft which support the coil and a motor which drives said shaft and therefore turns the coil first against the uncoiling direction while the friction wheel abutting against the outer surface of the coil drives the coil so that between a core and an outer surface of the coil a differential speed is produced and therefore the film in the coil is tensioned.

10. An arrangement as defined in claim 7, wherein said said sensor is mounted on said separating wedge.

11. An arrangement for lifting and grasping a starting portion of a film located in a coil, comprising a friction wheel which abuts against an outer surface of a coil of a film in which an end edge of a starting portion of the film is located in an arbitrary position on the outer surface of the coil; a separating edge abutting with prestress on an outer surface of the coil and having an edge which lifts a starting portion of the film from the coil; sensor means for recognizing a position of the end edge of the starting portion of the film; and means for first turning the coil opposite to a later uncoiling direction and then after the recognition of the position of the end edge of the starting portion of the film turning the coil in the uncoiling direction, said turning means including a shaft which support the coil and a motor which drives said shaft and therefore turning the coil first against the uncoiling direction while the friction wheel abutting against the outer surface of the coil driving the coil so that between a core and an outer surface of the coil a differential speed begin produced and therefore the film in the coil being tensioned, said sensor means having a piezoelectric measuring element.

12. An arrangement for lifting and grasping a starting portion of a film located in a coil, comprising a friction wheel which abuts against an outer surface of a coil of a film in which an end edge of a starting portion of the film is located in an arbitrary position on the outer surface of the coil; a separating edge abutting with prestress on an outer surface of the coil and having an edge which lifts a starting portion of the film from the coil; sensor means for recognizing a position of the end edge of the starting portion of the film; and means for first turning the coil opposite to a later uncoiling direction and then after the recognition of the position of the end edge of the starting portion of the film turning the coil in the uncoiling direction, said turning means including a shaft which support the coil and a motor which drives said shaft and therefore turning the coil first against the uncoiling direction while the friction wheel abutting against the outer surface of the coil driving the coil so that between a core and an outer surface of the coil a differential speed being produced and therefore the film in the coil being tensioned, said sensor means having a piezoelectric measuring element which is loaded with bending.

* * * * *